US011073404B2

(12) United States Patent
Fletcher (10) Patent No.: US 11,073,404 B2
(45) Date of Patent: *Jul. 27, 2021

(54) SYSTEMS AND METHODS FOR PROVIDING MOBILE MAPPING SERVICES INCLUDING TRIP PREDICTION AND ROUTE RECOMMENDATION

(71) Applicant: Oath Inc., Dulles, VA (US)

(72) Inventor: George Fletcher, Round Hill, VA (US)

(73) Assignee: VERIZON MEDIA INC., New York, NY (US)

( * ) Notice: Subject to any disclaimer, the term of this patent is extended or adjusted under 35 U.S.C. 154(b) by 127 days.

This patent is subject to a terminal disclaimer.

(21) Appl. No.: 15/715,313

(22) Filed: Sep. 26, 2017

(65) Prior Publication Data

US 2018/0017401 A1    Jan. 18, 2018

Related U.S. Application Data

(63) Continuation of application No. 13/906,078, filed on May 30, 2013, now Pat. No. 9,803,990.

(51) Int. Cl.
*G01C 21/34* (2006.01)
*G01C 21/36* (2006.01)

(52) U.S. Cl.
CPC ..... *G01C 21/3484* (2013.01); *G01C 21/3617* (2013.01)

(58) Field of Classification Search
None
See application file for complete search history.

(56) References Cited

U.S. PATENT DOCUMENTS

2005/0251325 A1    11/2005    Kudo et al.
2006/0173841 A1     8/2006    Bill
(Continued)

FOREIGN PATENT DOCUMENTS

EP       1548682 A2     6/2005
WO    2012132950 A1    10/2012

OTHER PUBLICATIONS

"Apple's Google Now Competitor 'Today' Features Traffic Information on Frequently Visited Locations," http://ww.macrumors.com/2013/06/12/today-feature-in-notification-center-provides-traffic-information-for-freuently-visited-locations, Jun. 13, 2013, 9 pages.

(Continued)

*Primary Examiner* — Nicholas K Wiltey
(74) *Attorney, Agent, or Firm* — Bookoff McAndrews, PLLC (57) ABSTRACT

Computer implemented methods are disclosed for providing geographical information to a user. One method includes observing, via location information generated or obtained through a user's mobile electronic device, a user traverse a preferred user route from the start location to the destination, and saving the preferred user route in relation to the user. The method may predict, based on past behavioral information for the user, a predicted start time of a future trip to the destination and may identify one or more routes from the start location to the destination. In addition, the method may compare, at a time relative to the predicted start time of the future trip, a duration or distance associated with traversing the preferred user route to a duration or distance associated with traversing the fastest route or the shortest route from the start location to the destination.

20 Claims, 6 Drawing Sheets

(56) References Cited

U.S. PATENT DOCUMENTS

| | | | |
|---|---|---|---|
| 2009/0005965 A1 | 1/2009 | Forstall et al. | |
| 2009/0006194 A1 | 1/2009 | Sridharan et al. | |
| 2010/0106603 A1 | 4/2010 | Dey et al. | |
| 2010/0169000 A1 | 7/2010 | Overgoor et al. | |
| 2010/0198494 A1 | 8/2010 | Chao et al. | |
| 2010/0312466 A1 | 12/2010 | Katzer et al. | |
| 2011/0238289 A1 | 9/2011 | Lehmann et al. | |
| 2011/0282576 A1 | 11/2011 | Cabral et al. | |
| 2012/0136561 A1 | 5/2012 | Barker et al. | |
| 2012/0307676 A1 | 12/2012 | Chan et al. | |
| 2014/0012494 A1* | 1/2014 | Cudak | G01C 21/3415 701/412 |
| 2014/0278051 A1* | 9/2014 | McGavran | G06N 20/00 701/400 |
| 2014/0279723 A1* | 9/2014 | McGavran | H04L 67/10 706/11 |
| 2014/0365120 A1* | 12/2014 | Vulcano | G01C 21/36 701/532 |

OTHER PUBLICATIONS

International Search Report and Written Opinion for corresponding International Application No. PCT/US2014/040011, dated Sep. 29, 2014.

\* cited by examiner

SYSTEMS AND METHODS FOR PROVIDING MOBILE MAPPING SERVICES INCLUDING TRIP PREDICTION AND ROUTE RECOMMENDATION

CROSS-REFERENCE TO RELATED APPLICATION(S)

This application is a continuation of and claims the benefit of priority to U.S. patent application Ser. No. 13/906,078, filed on May 30, 2013, the entirety of which is incorporated herein by reference.

TECHNICAL FIELD

Various embodiments of the present disclosure relate generally to providing mapping information. More specifically, exemplary embodiments of the present disclosure relate to systems and methods for predicting trip times and destinations, and determining optimal trip routing information, based in part on human- or evidence-based factors.

BACKGROUND

In planning a trip, such as an automobile trip, people often attempt to determine the best route to reach their destination. For example, people may wish to find a route with the shortest driving distance, or a route that will get them to their destination in the shortest amount of time. In order to provide drivers with this type of route information, traditional mapping services often calculate routes using preset methods based on known information, such as physical distances between locations and nearby connected roads. Recently, some mapping services have started using real-time traffic data to help improve the accuracy of routing information.

Most mapping systems only generate routes for people to select from once a user has begun their trip, or is soon to begin their trip. As a result, a user may not have information about real-time traffic data within enough time to select a more optimal route before beginning their trip. In addition, most mapping systems are relatively static and "forgetful." In other words, they only provide a simple function of comparing a current location with a destination at a particular moment (usually real-time), and determining and displaying one or more shortest and/or fastest routes. Because these mapping services do not include information regarding a user's preferences or behaviors, these mapping services may not provide optimal routing information for individual users. This may lead to user dissatisfaction with the mapping services, lost time, and increased fuel consumption.

Accordingly, a need exists for systems and methods for facilitating accurate and user-customizable mapping information, based, in part, on user or evidence-based factors. More specifically, a need exists for systems and methods for trip prediction and route recommendations based on user behavioral histories.

SUMMARY OF THE DISCLOSURE

According to certain embodiments, computer-implemented methods are disclosed for providing to a user geographical mapping information relating to a trip from a start location to a destination. One method includes observing, via location information generated or obtained through a user's mobile electronic device, a user traverse a preferred user route from the start location to the destination, and saving the preferred user route in relation to the user. The method also may include predicting, based on past behavioral information for the user, a predicted start time of a future trip to the destination, identifying one or more routes from the start location to the destination, the one or more routes including both the preferred user route and either a fastest or shortest route from the start location to the destination, and comparing, at a time relative to the predicted start time of the future trip, a duration or distance associated with traversing the preferred user route to a duration or distance associated with traversing the fastest route or the shortest route from the start location to the destination.

Various embodiments of the method may include one or more of the following features: predicting may include retrieving one or more previous start times and calculating the predicted start time based on the one or more previous start times; the one or more routes may be determined based on at least one of: routes saved by the user, one or more maps, and routes saved by other users; the step of comparing may include accessing data related to each of the one or more routes from at least one database selected from the group consisting of: a traffic database, a weather database, and an event database; the observed user route may be saved upon observing the user traverse the route and receiving the user's input requesting that the traversed route be saved as a user preferred route; the step of providing the information relating to the one or more routes to the destination may include saving map information for a predetermined radius from the one or more routes; the step of comparing may be performed at a predetermined time preceding the predicted start time of the future trip, where the duration or distance associated with traversing the preferred user route may be based on the predetermined time, and the duration or distance associated with traversing the fastest route or the shortest route may be based on the predetermined time; the start location may be an address of the user's home or workplace, and the destination is an address of the user's home or workplace; and the predicted time is a predicted commuting time; the step of observing may further include accessing information in at least one database and providing subsequent information relating to the one or more routes to the destination based on information accessed from the at least one database; the at least one database may be selected from the group consisting of: a traffic database, a weather database, and an event database; the past behavioral information may include one or more of an average time that the user departs his or her home for work, and an average time that the user departs his or her workplace for home.

According to another embodiment, systems are provided for providing to a user geographical mapping information relating to a trip from a start location to a destination. Certain systems may include: a data storage device storing instructions for causing computer servers or mobile devices to provide to a user geographical mapping information relating to a trip from a start location to a destination, and a processing device configured to execute the instructions to perform a method of: observing, via location information generated or obtained through a user's mobile electronic device, a user traverse a preferred user route from the start location to the destination, and saving the preferred user route in relation to the user, predicting, based on past behavioral information for the user, a predicted start time of a future trip to the destination, identifying one or more routes from the start location to the destination, the one or more routes including both the preferred user route and either a fastest or shortest route from the start location to the destination, and comparing, at a time relative to the predicted start time of the future trip, a duration or distance associated with traversing the preferred user route to a duration or distance associated with traversing the fastest route or the shortest route from the start location to the destination.

According to certain embodiments, a computer-readable medium is disclosed storing instructions that, when executed by a processor, cause the processor to provide geographical mapping information to a user relating to a trip from a start location to a destination, the method may include: observing, via location information generated or obtained through a user's mobile electronic device, a user traverse a preferred user route from the start location to the destination, and saving the preferred user route in relation to the user, predicting, based on past behavioral information for the user, a predicted start time of a future trip to the destination, identifying one or more routes from the start location to the destination, the one or more routes including both the preferred user route and either a fastest or shortest route from the start location to the destination, and comparing, at a time relative to the predicted start time of the future trip, a duration or distance associated with traversing the preferred user route to a duration or distance associated with traversing the fastest route or the shortest route from the start location to the destination.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes methods and systems for determining and presenting optimal mapping and routing information to users, based in part on human- or evidence-based factors. For example, optimal mapping and routing information may be determined by observing behaviors and preferences of individual users, determining recommended optimal mapping and routing information based in part on these observations, and presenting these recommendations to users for use during a trip.

According to embodiments of the present disclosure, route information may be presented to an electronic device of a user. The route information may be based on a comparison of various routes for a trip to a destination, including routes based on a user's previous preferred routes or other travel preferences. The route information may be presented to the user at a time interval prior to the user's predicted departure time for a trip and may include recommended routes. The user's predicted departure time and other predicted trip information may be determined based on collected historical user data, including previous trip start times and other factors, such as the date. The presentation of the route information may be on a user's electronic device, for example, through a software application, and may be stored in the memory of the electronic device.

During the trip, the user may be presented with information related to the route being taken, other routes to the same destination, and any other relevant information, such as points of interest along the route (e.g. gas stations, restaurants, rest areas, etc.) that may be pre-selected by the user. The user may also be provided with updated trip information (e.g. upcoming road closures) or re-routing information if the actual observed route is changed, for instance, due to a blocked street, a trip to a waypoint not along the route, etc.

Figure 1A:
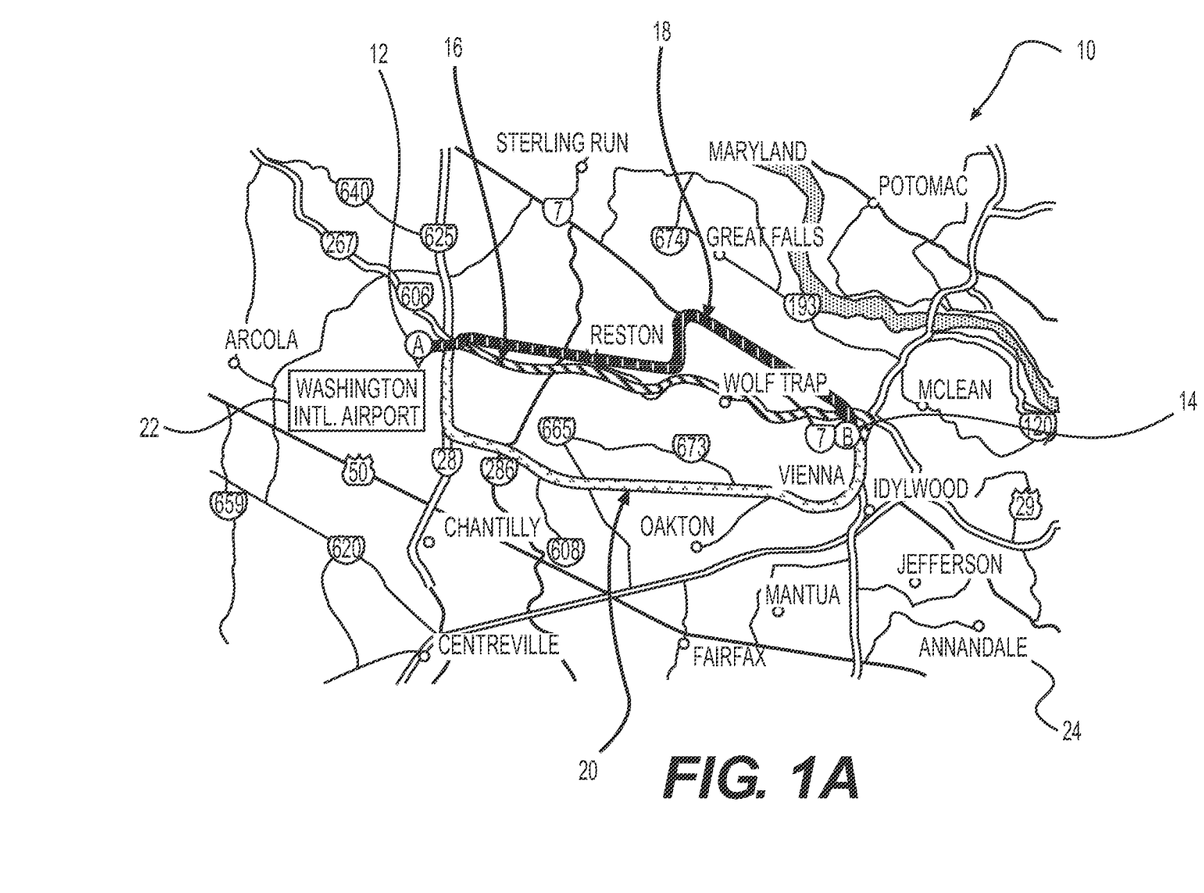
FIG. 1A is a diagram illustrating route presentations, according to an exemplary embodiment of the present disclosure.

Referring now to the figures, FIG. 1A is a routing diagram which shows one or more routes from a start location to an end location. Specifically, FIG. 1A depicts a map with a routing diagram 10 showing at least one route for a trip, such as routes 16, 18, and 20 from a start location 12, such as location A, to a destination location 14, such as location B. In one embodiment, the route diagram 10 may show a single route 16 from a start location 12 to a destination location 14. The single route 16 may be a best (shortest or fastest) recommended route or a user preferred route. In other examples, the route diagram 10 may display multiple optional or alternative routes 16, 18, and 20. In addition, while route diagram 10 may display one start location 12 and one destination location 14, route diagram 10 may alternatively display multiple start locations 12 and multiple destination locations 14. The route(s) may be between a commuters home and workplace, vacations road trips, or any other travel.

As will be discussed with respect to FIG. 2, the route diagram 10 may be displayed on any electronic device 203, such as a mobile device 204, navigation system 206, computer 208 (e.g. laptop, tablet, desktop), or electronic kiosk, and/or it may be printed, or displayed through any other suitable manner. The route diagram may be any suitable size for visualization by a user. When displayed on an electronic device 203, the route diagram 10 may be manipulated, for example, the route diagram may be zoomed in and/or out, scrolled across, rotated, etc., in any suitable manner, such as by selecting (e.g. clicking an icon, using a touch screen, etc.) a portion of the route diagram 10 to manipulate.

The start location 12 and the destination location 14 may be any locations identifiable on a map, such as having a street address or identifiable latitude and longitude coordinates. For example, start location 12 may be a street address, location within a building, location within a park, location within a body of water, location in the air, or any other identifiable location. Routes 16, 18, and 20 may be any routes from the start location 12 to the destination location 14. The routes 16, 18, and 20 may be navigable by any mode of transport, such as by foot, via road, via water, via air, on any other suitable means.

The route diagram 10 also may include geographic and map information, such as points of interest 22 (e.g. airports, stadiums, schools, landmarks, such as monuments, mountains, etc.) geographic information 24 (e.g. countries, states, counties, cites, roads, rivers, lakes, etc.) travel points of interest (e.g. gas stations, restaurants, rest areas, etc.), and any other relevant information that a user may select to be displayed using any suitable means.

One or more routes 16, 18, and 20 may be displayed in a distinguishing manner, either by different colors, different patterns, different shades, via differing animations (e.g. flashing, moving feature, or any other animation), or any other graphically distinguishing manner. The route diagram 10 may provide real-time or live information, such as traffic, weather, and event information. For example, the routes 16, 18, 20 may change in color, shade, animation etc. to signify slow traffic conditions or any other relevant information relating to the route.

As discussed above, the route diagram 10 also may be manipulated (e.g. zoomed in and out, scrolled across), and also may be interactive, either by using a keyboard, touch-screen, mouse, or any other user input. For example, the routing diagram 10 may include one or more user-selectable portions that, when selected, may present additional and/or more detailed information associated with the user-selectable portion of the diagram 10.

Figure 1B:
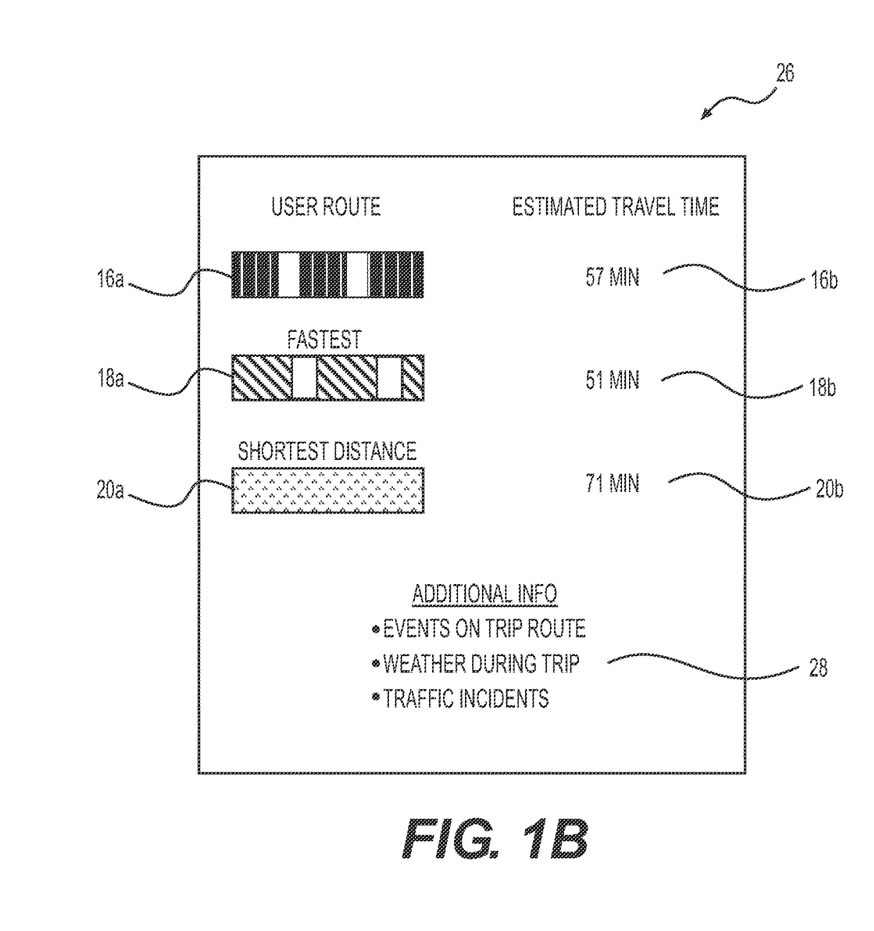
FIG. 1B is a diagram illustrating route information, according to an exemplary embodiment of the present disclosure.

FIG. 1B shows a route information section 26, which may be displayable within or separate from the routing diagram 10. For example, the route information section 26 may be displayed as overlapping the routing diagram 10 or non-overlapping the routing diagram 10 when displayed on the electronic device 203. The routing information section 26 may include one or more legends 16a, 18a, and 20a for each respective route 16, 18, 20, to and from the same locations, and any relevant information relating to the route, such as characteristic information and/or the estimated travel time 16b, 18b, and 20b. For example, the legend may be a sample of the same color, pattern, shade, animation, or other graphically distinguishing display used for presenting the respective route 16, 18, and 20. The information included in each of the route descriptions 16a, 18a, and 20a may include if the route has any characteristic, such as shortest distance, fastest route, user based route, other user "favorited" or recommended route, external recommended route (e.g., according to a travel expert), and/or any other route characteristic. Information regarding the route may include, for example, estimated travel time, estimated arrival time, traffic alerts, and/or any other relevant information. The route information section 26 also may include any other relevant information 28, such as events on the trip route, weather during the trip, traffic incidents, and/or any other relevant information. Any portion of the route information section may be manipulated (e.g., zoomed, selected, and/or scrolled).

The route information section 26 may indicate a hierarchy of recommended routes for the trip from the best route to the least best route. As explained in further detail below, the best route may be based on several factors including the user's driving preferences and/or also may allow user adjustment of which characteristics should be considered in determining the best route. For example, the routing information 26 may indicate the best route by placing it at a top of a display of routing information section 26 and the next best routes following in sequential order. The routing information also may show routes having various characteristics, such as the fastest route, the shortest distance, scenic route, and one or more of these routes may also be included as one or more of the recommended routes. The user may select one or more routes 16, 18, or 20 from the route information section 26 for display on route diagram 10 at any time prior, during, or after the trip. For example, the route information section 26 may present a previously saved user route (e.g., a route previously taken by the user and saved by the electronic device), a calculated recommended fastest route, a calculated recommended shortest route, etc., and the user may select one or more of these routes for display on the route diagram 10 during the trip.

Figure 2:
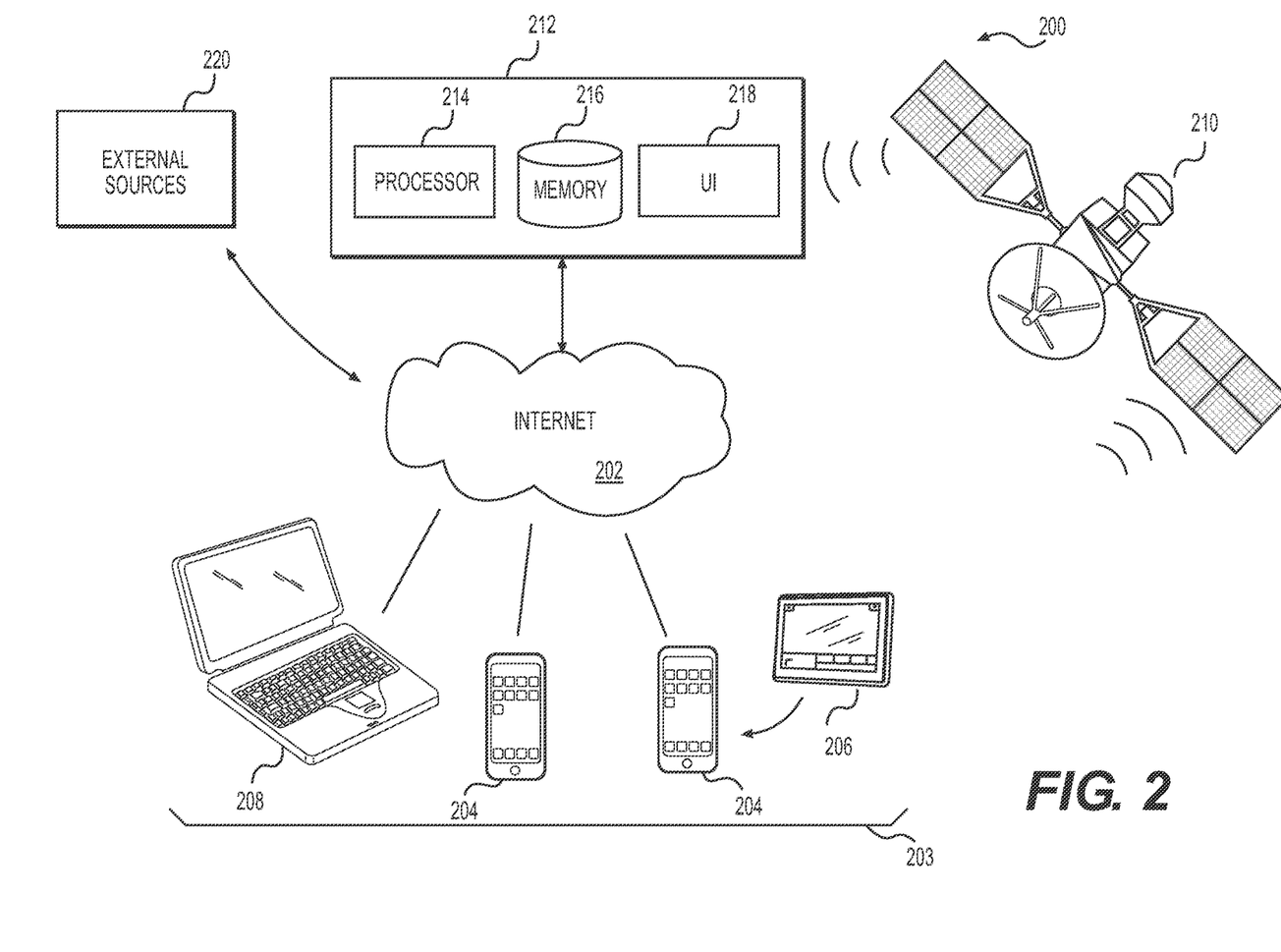
FIG. 2 is a block diagram of a communications system capable of presenting routes between a start location and destination locations, according to an exemplary embodiment of the present disclosure.

FIG. 2 is a block diagram of a communications system 200 capable of presenting routes and route information for a trip, between at least two points, for example, between start locations 12 and destination locations 14 via a network, such as the Internet 202, to one or more electronic devices 203, such as a mobile device 204 (e.g., mobile phone, personal digital assistant, tablet computer), a GPS device 206 (e.g., part of a car of a handheld GPS), a computer 208, and/or any device connected to the Internet 202, according to an exemplary embodiment of the present disclosure.

The electronic device 203 may include an application, such as a mobile application, configured to process and execute instructions and save data in memory. The mobile application may be configured to provide information, such as location information to a server 212 for processing by a processor 214 and the processed information may be communicated by the server 212 to the electronic device 203 via the Internet 202 for display to the user.

For example, the location information of the electronic device 203 (e.g., address, map coordinates, compass directions, etc.), may be determined by the server 212 by any suitable method. For example, a location of an electronic device 203 may be determined by receiving a user input via the electronic device 203, via global positioning information from the electronic device 203 via a satellite 210 and the Internet 202, via cellular tower locations (e.g., receiving, from the mobile device 204, information regarding which cellular towers it is currently in communication with), from a GPS device 206, and/or via Wi-Fi locations (e.g., receiving, from the electronic device 203, information regarding which Wi-Fi locations and/or the Internet Protocol (IP) addresses it is using) or any other suitable manner.

Various electronic devices 203 may also communicate with each other by any suitable means (e.g., via the Internet, Bluetooth, Near Field Communication, or any other suitable means) to send and receive information. For example, a mobile device 204 may communicate with a GPS device 206 in communication with a satellite 210. In one embodiment, the GPS device 206 may be part of a vehicle, such as a car, truck, boat, motorcycle, plane, helicopter, bicycle, or any other vehicle, or may be removable from the vehicle and carried by a user.

The electronic device 203 may receive information regarding a user's trip, for example, a start location 12, travel route, and destination location 14 and may communicate this information to a server 212 that may have a processor 214, memory, 216, and user input 218. The server 212 may save the information in memory 216, such as a computer readable memory. The electronic device 203 may access the information (e.g., retrieve) from the memory 216 of the server 212, such as an application server, via the Internet 202 using the application, such as a mobile application stored in the memory of the electronic device 203. For example, the mobile application may be initially downloaded by the electronic device 203 via the Internet 202 and saved in the memory of the electronic device 203. The mobile application may be any machine readable code for executing instructions, such as software, configured to be processed by the electronic device 203.

The electronic device 203 also may be in communication with one or more external sources 220 via, for example, the Internet 202, and the server 212. The external source 220 may be any source of routing and/or mapping information. For example, external source 220 may be other users, traffic reports, map providers, weather reports, police reports, or any other source of relevant information. The server 212 may receive information from the external source 220 and process the information using processor 214 for display on the electronic device 203. The processed information may be communicated to the application on the electronic device 203, via the Internet 202. The application may cause the processed information to be saved and/or displayed on the electronic device 203.

Figure 3:
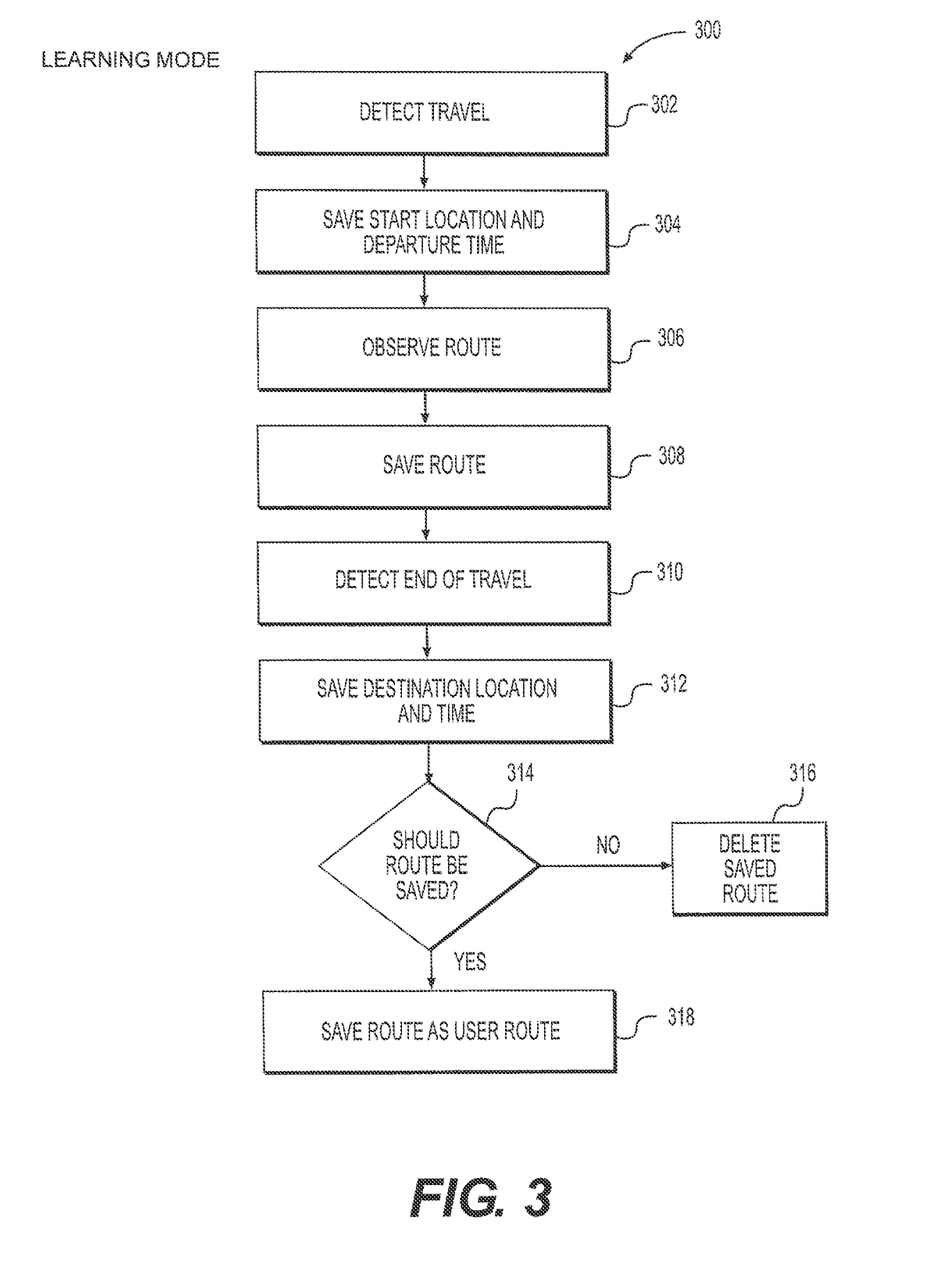
FIG. 3 is a flow diagram of an exemplary method of obtaining user based information for use in presenting a route, according to an exemplary embodiment of the present disclosure.

FIG. 3 is a flowchart of an exemplary method 300 of obtaining user based information for later use in presenting a route to a user consistent with embodiments of the present disclosure. The method 300 may be used for any mode of travel, and for providing recommended routes to users via any known GPS or mobile device. As described above with respect to FIG. 2, method 300 may be performed by any component or combination of server(s) 212, external sources 220, GPS satellites 210, and/or electronic devices 202.

Figure 4:
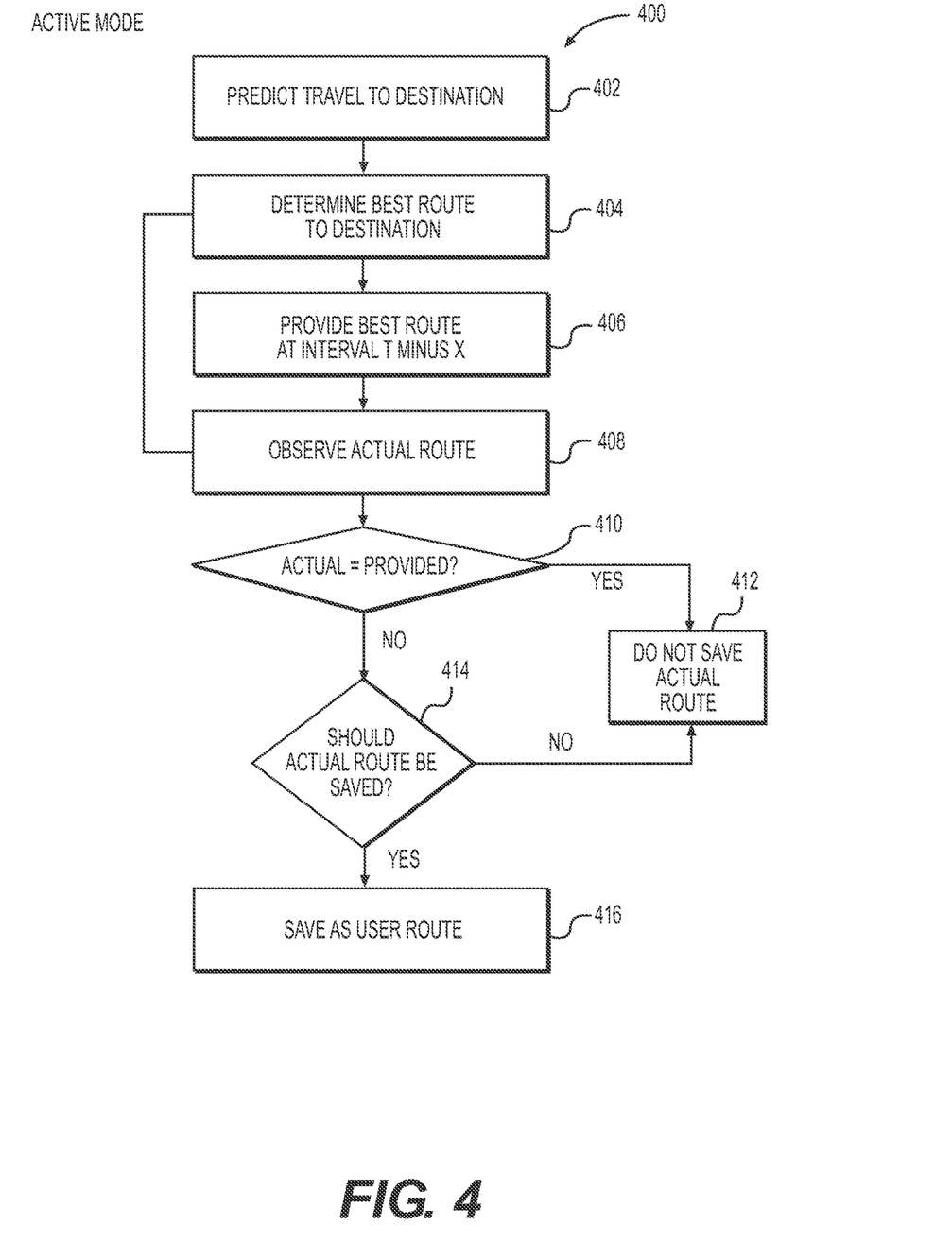
FIG. 4 is a flow diagram of an exemplary method of presenting a route, according to an exemplary embodiment of the present disclosure.

In one embodiment, method 300 may be a passive learning mode of an electronic device application, such as a mobile application stored on an electronic device 203. The passive learning mode may be used to obtain and collect data on a user's trip habits/behaviors and preferences, such as, departure time, destination(s), preferred travel route, types of road avoided, etc. and any other travel information. The learning mode of method 300 may use the collected data in an algorithm to calculate the user's predicted trip preferences. For example, the algorithm may average multiple departure times within a preset time range to determine a predicted departure time, which may be used in predicting trip time and destination, and providing trip planning information in an active mode of method 400.

Specifically, in one embodiment, at step 302, the electronic device 203, may detect the start of travel. This may be accomplished by the electronic device 203 obtaining its location information using GPS information. For example, the electronic device 203 may be in constant direct or indirect communication with a GPS provider, such as a satellite 210, or may communicate with the satellite 210 at any time interval, for example, every 5 minutes, every 10 minutes, every 15 minutes, every hour, every two hours, etc., or may only communicate with the satellite 210 when the user instructs the electronic device 203 to communicate with the satellite 210. The location information may be the address, map coordinates, or any other location information.

Based on a change in location information, the electronic device 203 may identify or detect travel at step 302. For example, if the location information for the electronic device 203 exceeds a predetermined distance threshold, then the server 212 in communication with the electronic device 203 may indicate/detect travel. The predetermined distance threshold may be any distance that may be set by the user, or by the application. For example, the predetermined distance may be 0.1 mile, 0.25 mile, 0.5 mile, 1 mile, 2 mile, etc. Alternatively, a user input may indicate that travel has begun, either by selecting a destination, or by requesting the sever 212 and/or mobile application to track the user's following movements as being a route to save (e.g., by clicking "Follow me" or "Save the following movements"). In addition, the electronic device 203 may automatically track the device movements as a passive mechanism to learn the user's preferred routes.

At step 304, the start location 12, such as point A, may be saved in memory of the electronic device 203 and/or the memory 216 of the server 212. The start location 12 may be any identifiable location, such as a street address, map coordinates, POIs, or any other identifiable location. The departure time may also be saved in memory. The departure time may be the time associated with the time the predetermined distance threshold was exceeded. For example, the mobile device may detect a change of location at a distance threshold of 0.3 miles at a certain time, and associate the certain time with a trip start time. The trip start time along with the location prior to the distance threshold being reached may be saved in memory as trip information data.

At step 306, the electronic device 203 may communicate its location to the server 212 at various times and locations during the trip. In one embodiment, the electronic device 203 may communicate its location to server 212 in real-time. The observed route at step 306 may be saved in memory at step 308, for example, in memory of the electronic device 203 and/or memory 214 of server 212. The location information may be obtained until it is determined, at step 310, that the trip has been completed and a destination location 14, such as destination location B has been reached.

Specifically, at step 310, electronic device 203 may determine that a destination location has been reached and travel has ended, by any suitable means. For example, by determining that there has been no change in location over the same or a different predetermined distance threshold over a predetermined interval of time (e.g. 5 minutes, 10 minutes, 20 minutes, 30 minutes, etc.), or any other suitable manner. For example, if the location of the electronic device 203 does not change more than 0.3 mile over 5 minutes, then a trip destination location and trip end time may be saved in memory as part of the trip information data. In addition, any other observed route information also may be saved as trip information data for later use in providing trip route recommendations. For example, the electronic device 203 may observe that the user avoided certain roads, took a particular exit from the highway, stopped a point prior to the destination location etc. This information may be saved as user preferences or user habits.

At step 312, the saved route at step 308, including the start location 12 and destination location 14, based on the route observed at step 306 may be compared, using the processor, such as server processor 214, to any previously saved user routes saved in memory. The route saved in temporary memory at step 308 may only be saved at step 312 if it is determined not to be the same or substantially the same as a previously saved user route. The determination of whether routes are the same may be based on any suitable algorithm for comparing the similarity of routes.

At step 314, the electronic device 203 may prompt the user as to whether the route saved at steps, 308, 312 should be saved as a user preferred route for later use. The prompt may be displayed on the electronic device 203 and may require user input via any suitable means for example, confirming that the route should be saved by any suitable manner, such as selecting an icon. Based on the user input at step 314, the route may be saved in memory at step 318 as a user preferred route, or deleted from memory at step 316.

The user preferred route, saved in memory in step 318 of the learning mode-type method 300, may be used in an active routing mode such as depicted in method 400, which may include a process of presenting optimal travel routes to a user. For example, FIG. 4 shows a method 400 having an active mode for predicting a time and destination of a user's upcoming trip, and recommending routes for the predicted trip. Like the learning mode of method 300, the active mode of method 400 may be performed by any component or combination of server(s) 212, external sources 220, GPS satellites 210, and/or electronic devices 203, such as by communicating information over the Internet 202. In one embodiment, method 400 may include predicting a user's trip, determining and recommending one or more best routes based on a comparison of one or more routes and other factors, such as user preferences and habits, presenting the results of the determination to the user, prior to commencement of the trip, and/or providing trip information during the trip.

At step 402 of the method shown in FIG. 4, the start of a user's trip from a certain start location, such as location 12 to one or more destination locations 14, such as destination location B, may be predicted by any suitable means, such as, for example, based on previously saved departure times obtained in step 304 of the learning mode in method 300. As discussed above, the predicted departure time, destination and other trip information may be based on data collected regarding the historical user departure times within a preset threshold. The collected data may be processed using any one or more suitable algorithms, to determine predicted trip information, such as trip start time, trip start location, and trip destination location. For example, the electronic device 203 may determine, based on data collected in the learning mode of method 300, that on average, e.g., on Monday through Thursday, a user commences a trip from start location 12 to destination location 14 between 5:30 PM and 5:45 PM, and on Fridays, the user commences the same trip between 4:00 PM and 4:15 PM. The data collected in the learning mode may be continually used to update predicted travel information used at step 402.

The electronic device 203 may associate one or more user trip start times with user travel from a start location 12 to a destination location 14. The departure times associated with a user trip may be saved in memory, such as server memory 216 and/or memory of the electronic device 203.

At step 404, the electronic device 203, either alone or together with server(s) 212, may determine recommendations for one or more best routes to a destination at a preset time prior to the predicted trip start time. For example, at step 404, recommendations for the best trip routes may be determined for presentation to the user. Step 404 may occur at a predetermined amount of time "x" prior to the predicted departure time "T," such as "T−x" so that the determination results may be presented to the user at Step 406. The predetermined time may be any suitable increment of time, for example 30 seconds, 1 minute, 5 minutes, 10 minutes, 15 minutes, half an hour, one hour, etc. For example, if the predicted trip start time for a predicted trip is determined to be between 5:30 PM-5:45 PM, the electronic device 203 may calculate the recommended best routes at 5:15 PM (5:30 PM minus 15 minutes) and present the results as recommended best routes to the user at this time.

The recommended best routes may be determined by comparing any saved user preferred routes for a previously saved trip, such as those saved at step 318, with other routes. The other routes may include routes generated by one or more mapping algorithms, such as, for example, mapping algorithms generated by a mapping website, generated by the electronic device 203, or any other algorithms generated by any other means accessible by the electronic device 203. The mapping algorithms may be based on various factors, such as shortest distance, fastest travel time, least traffic lights, most scenic route, best route for trucks, motorcycles, or any other type of vehicle, any user trip preferences determined by observing the travel preferences and habits of the user, or any other factors or combination of factors, and may be adjusted by the user.

Figure 5:
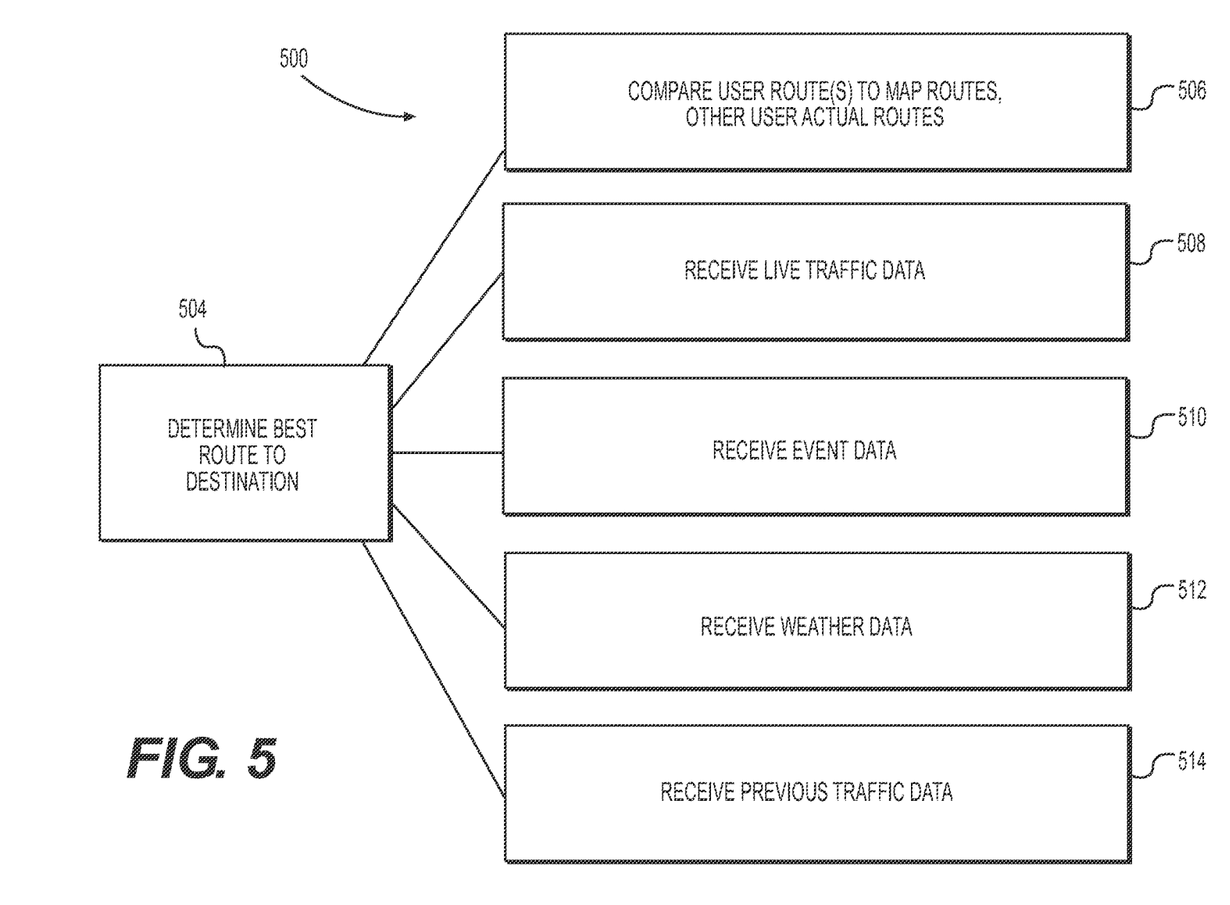
FIG. 5 is block diagram of exemplary factors in presenting a route, according to an exemplary embodiment of the present disclosure.

The user preferred routes saved in memory and the other routes may be compared using one or more algorithms generated by the application accessed by the electronic device 203. The algorithm(s) may include one or more factors, which may also include any user inputted factors. For example, as shown in FIG. 5, the determination of the best route 504 (corresponding to step 404) may include such factors as actual routes recently taken by other users 506, live traffic data 508 (e.g. accidents, constructions, detours, etc.), event data 510 (e.g. large event at nearby venues, early closing of nearby schools, parades along potential route, public transportations closure, etc.), weather and road condition data 512 (e.g. icing roads, flooded roads, high winds), historical traffic data 514 (e.g. traffic data for previous days for the predicted routes), any/or any combination of these and/or any other relevant factors.

The recommended best route(s) and any information relating to the route may be saved in memory, such as in a cache of the electronic device 203, and may be accessible by the user at any time, for example, when the electronic device 203 is not connected to the Internet. Examples of information relating to the route that may be saved in memory may include points of interest (e.g., gas stations, restaurants, rest areas, etc.) within a predetermined or user-defined radius along the route. For instance, the user may select that all gas stations within a 2 mile radius of the route be obtained. In this manner, information may be saved in the memory of the electronic device 203 and may be retrievable by the user even when the electronic device 203 is not connected to the Internet.

At step 406, as discussed above, the recommended best route or routes determined at step 404 may be presented to the user via electronic device 203 at a time interval prior to the predicted departure e.g. at T−x. The recommended best route(s) may be presented within route information section 26, for example, as shown in FIG. 1 discussed above. The user may select one or more routes 16, 18, and 20 from the recommended routes, including any saved user preferred routes, for display on the route diagram 10. An alert may also be provided at step 406 to inform the user of any relevant information regarding any of the recommended or user's preferred routes. For example, when determining the best route at step 404, the user's preferred routes may be analyzed to determine any traffic delays or any other effect on the user's preferred route, for example, if there is an accident causing delays on the user's preferred route, or a road or closed, etc.

At step 408, the actual route taken by the user may be observed and compared at step 410 to determine if the actual route is the same as the best route presented at step 406. The application may provide the user with information relating to the route, such as predicted traffic, weather, event information, point of interest information (e.g. nearby gas stations), detour and/or re-routing information. The method may also calculate recommended best routes at step 404 based on the actual route observed at step 408 so as to provide updated route recommendations. For example, if it is determined that traffic congestion exists further along the observed actual route at step 408, updated routing information may be determined at step 404 and presented to the user.

The user may be asked if an actual route should be saved at step 414 if it is not the same as the best route presented at step 406. At step 412, the actual route may not be saved if it is either the same as the best route presented at step 406 or if the user indicates that the actual route should not be saved. At step 416, the actual route and/or the route generated by the electronic device and presented at step 406 may be saved if the user indicates that it should be saved at step 414.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for providing, to a user, geographical mapping information relating to a trip, the method including, using a processor for:
   obtaining, via location information from a user's mobile electronic device in communication with a GPS provider, historical route information of a route by the user from a first start location to a first destination, the obtained historical route information being saved as previously saved route information;
   observing an actual route taken by the user, via location information from the user's mobile electronic device in communication with the GPS provider in real-time, to determine whether the observed actual route information is stored within the previously saved route information;
   upon determining that the observed actual route information is not stored within the previously saved route information, storing the observed actual route information with the previously saved route information for later use in providing trip route recommendations;
   predicting, in real-time, an upcoming trip from a second start location, which is different from the first start location, to a second destination, which is different from the first destination;
   determining a route from the second start location to the second destination based on the previously saved route information, including the observed actual route information;
   determining additional information for the determined route including one or more of an estimated travel time and an estimated arrival time; and
   displaying the determined route and the determined additional information on a display of the user's mobile electronic device.

2. The method of claim 1, wherein the observed actual route information is information of a common route traversed by the user from the first start location to the first destination on multiple days and within a time interval on each of the multiple days.

3. The method of claim 2, further comprising:
   predicting, on a particular day, based on the location information for the user and a comparison of a current time to the time interval, that the user will be making a future trip to the first destination within the time interval on the particular day.

4. The method of claim 3, wherein the step of predicting comprises accessing data related to the previously saved route information from at least one database selected from the group consisting of: a traffic database, a weather database, and an event database.

5. The method of claim 3, wherein the first start location is an address of the user's home or workplace, and the first destination is an address of the user's home or workplace; and the predicted start time is a predicted commuting time.

6. The method of claim 1, wherein the observed actual route information is a route saved by the user.

7. The method of claim 1, further comprising:
   displaying an identification of a shortest or fastest one of:
   (i) the determined route, (ii) a fastest route from the second start location to the second destination, and (iii) a shortest route from the second start location to the second destination.

8. A system for providing to a user geographical mapping information relating to a trip from a first start location to a first destination, the system including:
   a data storage device storing instructions for causing computer servers or mobile devices to provide to a user geographical mapping information relating to a trip from the first start location to the first destination; and
   a processing device configured to execute the instructions to perform a method of:
   obtaining, via location information from a user's mobile electronic device in communication with a GPS provider, historical route information of a route by the user from the first start location to the first destination, the obtained historical route information being saved as previously saved route information;
   observing an actual route taken by the user, via location information from the user's mobile electronic device in communication with the GPS provider in real-time, to determine whether the observed actual route information is stored within the previously saved route information;
   upon determining that the observed actual route information is not stored within the previously saved route information, storing the observed actual route information with the previously saved route information for later use in providing trip route recommendations;

predicting, in real-time, an upcoming trip from a second start location, which is different from the first start location, to a second destination, which is different from the first destination;

determining a route from the second start location to the second destination based on the previously saved route information, including the observed actual route information;

determining additional information for the determined route including one or more of an estimated travel time and an estimated arrival time; and displaying the determined route and the determined additional information on a display of the user's mobile electronic device.

9. The system of claim 8, wherein the observed actual route information is information of a common route traversed by the user from the first start location to the first destination on multiple days and within a time interval on each of the multiple days.

10. The system of claim 9, the method further comprising:
predicting, on a particular day, based on the location information for the user and a comparison of a current time to the time interval, that the user will be making a future trip to the first destination within the time interval on the particular day.

11. The system of claim 10, wherein the step of predicting comprises accessing data related to the previously saved route information from at least one database selected from the group consisting of: a traffic database, a weather database, and an event database.

12. The system of claim 10, wherein the first start location is an address of the user's home or workplace, and the first destination is an address of the user's home or workplace; and the predicted start time is a predicted commuting time.

13. The system of claim 8, wherein the observed actual route information is a route saved by the user.

14. The system of claim 8, the method further comprising:
displaying an identification of a shortest or fastest one of: (i) the determined route, (ii) a fastest route from the second start location to the second destination, and (iii) a shortest route from the second start location to the second destination.

15. A non-transitory computer-readable medium storing instructions that, when executed by a processor, cause the processor to provide geographical mapping information to a user relating to a trip from a first start location to a first destination, the method including:
obtaining, via location information from a user's mobile electronic device in communication with a GPS provider, historical route information of a route by the user from the first start location to the first destination, the obtained historical route information being saved as previously saved route information;

observing an actual route taken by the user, via location information from the user's mobile electronic device in communication with the GPS provider in real-time, to determine whether the observed actual route information is stored within the previously saved route information;

upon determining that the observed actual route information is not stored within the previously saved route information, storing the observed actual route information with the previously saved route information for later use in providing trip route recommendations;

predicting, in real-time, an upcoming trip from a second start location, which is different from the first start location, to a second destination, which is different from the first destination;

determining a route from the second start location to the second destination based on the previously saved route information, including the observed actual route information;

determining additional information for the determined route including one or more of an estimated travel time and an estimated arrival time; and displaying the determined route and the determined additional information on a display of the user's mobile electronic device.

16. The non-transitory computer-readable medium of claim 15, wherein the observed actual route information is information of a common route traversed by the user from the first start location to the first destination on multiple days and within a time interval on each of the multiple days.

17. The non-transitory computer-readable medium of claim 16, the method further comprising:
predicting, on a particular day, based on the location information for the user and a comparison of a current time to the time interval, that the user will be making a future trip to the first destination within the time interval on the particular day.

18. The non-transitory computer-readable medium of claim 17, wherein the step of predicting comprises accessing data related to the previously saved route information from at least one database selected from the group consisting of: a traffic database, a weather database, and an event database.

19. The non-transitory computer-readable medium of claim 15, wherein the observed actual route information is a route saved by the user.

20. The non-transitory computer-readable medium of claim 15, the method further comprising:
displaying an identification of a shortest or fastest one of: (i) the determined route, (ii) a fastest route from the second start location to the second destination, and (iii) a shortest route from the second start location to the second destination.

* * * * *